US 12,356,964 B2

(12) United States Patent
Komatsubara et al.

(10) Patent No.: US 12,356,964 B2
(45) Date of Patent: Jul. 15, 2025

(54) CAT DIAPER

(71) Applicant: Unicharm Corporation, Ehime (JP)

(72) Inventors: Daisuke Komatsubara, Kanonji (JP);
Yumi Matsumoto, Kanonji (JP)

(73) Assignee: Unicharm Corporation, Ehime (JP)

( * ) Notice: Subject to any disclaimer, the term of this patent is extended or adjusted under 35 U.S.C. 154(b) by 225 days.

(21) Appl. No.: 17/751,559

(22) Filed: May 23, 2022

(65) Prior Publication Data
US 2022/0279758 A1    Sep. 8, 2022

Related U.S. Application Data

(63) Continuation of application No. PCT/JP2020/038590, filed on Oct. 13, 2020.

(30) Foreign Application Priority Data

Nov. 25, 2019   (JP) .................................. 2019-212730
Nov. 25, 2019   (JP) .................................. 2019-212731

(51) Int. Cl.
*A01K 23/00*      (2006.01)
(52) U.S. Cl.
CPC .................................... *A01K 23/00* (2013.01)
(58) Field of Classification Search
CPC .................. A01K 23/00; A01K 13/006; A61F 13/49413; A61F 13/49007; A61F 2013/15186
USPC ................................................... 604/385.09
See application file for complete search history.

(56) References Cited

U.S. PATENT DOCUMENTS

| | | | |
|---|---|---|---|
| 3,999,547 A | * | 12/1976 | Hernandez ........ A61F 13/49413 604/375 |
| 2014/0076246 A1 | | 3/2014 | Komatsubara et al. |
| 2018/0014508 A1 | * | 1/2018 | Fang .................... A01K 13/006 |
| 2019/0060136 A1 | | 2/2019 | Turner et al. |

FOREIGN PATENT DOCUMENTS

| | | |
|---|---|---|
| CN | 103442555 A | 12/2013 |
| JP | 3180238 U | 12/2012 |
| JP | 2013-009657 A | 1/2013 |

(Continued)

OTHER PUBLICATIONS

Written Opinion issued in corresponding International Application No. PCT/JP2020/038590 mailed Jan. 12, 2021 (3 pages).

(Continued)

*Primary Examiner* — Peter M Poon
*Assistant Examiner* — Carly W. Lynch
(74) *Attorney, Agent, or Firm* — Osha Bergman Watanabe & Burton LLP

(57) ABSTRACT

A cat diaper has a lateral direction along a waistline of a cat and a longitudinal direction orthogonal to the lateral direction, and includes: a body portion that has a top-surface sheet, a back-surface sheet, and an absorbent core disposed between the top-surface sheet and the back-surface sheet; and a tail hole formed in the body portion, the tail hole including a hole body through which a tail of the cat is inserted, the hole body bulging toward a stomach side or a back side of the cat diaper, and a lateral length of the hole body being not less than 1.90 times a longitudinal length of the hole body.

16 Claims, 8 Drawing Sheets

(56) References Cited

FOREIGN PATENT DOCUMENTS

| | | | |
|---|---|---|---|
| JP | 2013-135638 A | 7/2013 | |
| JP | 5717499 B2 * | 5/2015 | ............. A01K 23/00 |
| JP | 2017-131160 A | 8/2017 | |
| WO | 2012/132886 A1 | 10/2012 | |

OTHER PUBLICATIONS

International Search Report issued in corresponding International Application No. PCT/JP2020/038590 mailed Jan. 12, 2021 (5 pages).

Office Action issued in corresponding Chinese Patent Application No. 202080078711.4 dated Feb. 4, 2023 (13 pages).

Office Action issued in corresponding Indonesian Application No. P00202205821, dated Dec. 15, 2023.

* cited by examiner

FIG. 7

| | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| W71 | 19 | 20 | 28.3 | 36.7 | 35 | 35 | 25 | 26 | 27.5 | 30 | 32 | 26 | 23.4 | 35 |
| Z71 | 10.0 | 10.0 | 8 | 8 | 7 | 5.5 | 33 | 31 | 32 | 32 | 31.1 | 21 | 12.8 | 5 |
| W71 / Z71 | 1.90 | 2.00 | 3.54 | 4.59 | 5.00 | 6.36 | 0.76 | 0.84 | 0.86 | 0.94 | 1.03 | 1.24 | 1.82 | 7.00 |
| Evaluation | ○ | ○ | ◎ | ◎ | ◎ | ◎ | × | × | × | × | × | × | × | × |

FIG. 8

| | Example 7 | Example 8 | Example 9 | Example 10 | Example 11 | Example 12 | Example 13 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|---|---|
| Angle | 80.00 | 80.00 | 59.00 | 47.00 | 47.00 | 35.00 | 32.00 | 90.00 | 90.00 | 90.00 | 90.00 | 85.00 | 90.00 | 82.00 |
| Evaluation | ◎ | ◎ | ◎ | ◎ | ◎ | ◎ | ○ | × | × | × | × | × | × | × |

CAT DIAPER

CROSS-REFERENCE TO RELATED APPLICATIONS

The present application claims priority to Japanese Patent Application Nos. 2019-212730 filed on Nov. 25, 2019, and 2019-212731 filed on Nov. 25, 2019, which are incorporated herein by reference and are regarded as a part of the description of this specification.

BACKGROUND

Technical Field

The present invention relates to a cat diaper to be put on a cat.

Description of Related Art

Patent Literature 1 discloses a pet diaper to be put on pets such as dogs and cats. The pet diaper of Patent Literature 1 has a tail hole for a pet's tail to pass through. In the vicinity of the tail hole of the diaper of Patent Literature 1, an elastic member is provided which contracts the body of the diaper so as to close the tail hole. Because the tail hole is deformed to close by the contraction of the elastic member, the tail hole opening easily fits the tail.

PATENT LITERATURE

Patent Literature 1: Japanese Unexamined Patent Application Publication No. 2013-9657

The pet diaper disclosed in Patent Literature 1 is constituted so that it can be put on dogs and cats. However, as a result of intensive studies, the applicant has found that the distance between the urination opening and the tail is shorter in cats than in dogs in many cases. Therefore, in a case where a cat wears a diaper that suits the body shape of a dog, sometimes the position of tail does not match the position of tail hole in the longitudinal direction of the diaper put on, and the tail hole widens too much in the longitudinal direction. Due to that, in a case where a cat wears the pet diaper designed for a dog, sometimes the diaper is displaced when the cat is in the diaper, and leakage occurs. Especially, a male cat often has the nature of urinating as though spraying the urine. In a case where a cat in a displaced diaper sprays urine, the urine is scattered in all directions. Therefore, there is a demand for a cat diaper that is not easily displaced while being worn.

SUMMARY

An aspect of the present invention provides a cat diaper that is not easily displaced while being worn.

A cat diaper according to an aspect has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted. The hole body portion bulges in a form of projection toward the stomach side or the back side. A length of the hole body portion in the lateral direction is not less than 1.90 times a length of the hole body portion in the longitudinal direction.

A cat diaper according to another aspect has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted. The hole body portion bulges in a form of projection toward the stomach side or the back side. The hole body portion is in the shape of an arc that connects an apex and base end edges on both sides. The radius of curvature of the arc is in a certain range. The certain range means that the radius of curvature is uniform or means that a difference between the maximum radius of curvature and the minimum radius of curvature is not more than 5% of a length of the hole body portion in the lateral direction. The angle formed between a virtual line that connects the base end edges of the hole body portion and a tangent line of a rising portion rising from the base end edges toward the apex is 80° or less.

A cat diaper according to another aspect has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted, and a notch portion that increases the dimension of the hole body portion by communicating with the hole body portion. The notch portion has a lateral notch portion that is provided in a lateral region that extends to the outer side in the lateral direction from the hole body portion.

BRIEF DESCRIPTION OF DRAWINGS

FIG. 7 is a view showing the results of comparative evaluation on ratios of hole body portions.

FIG. 8 is a view showing the results of comparative evaluation on angles of hole body portions.

DETAILED DESCRIPTION

(1) Summary of Embodiments

Figure 1:
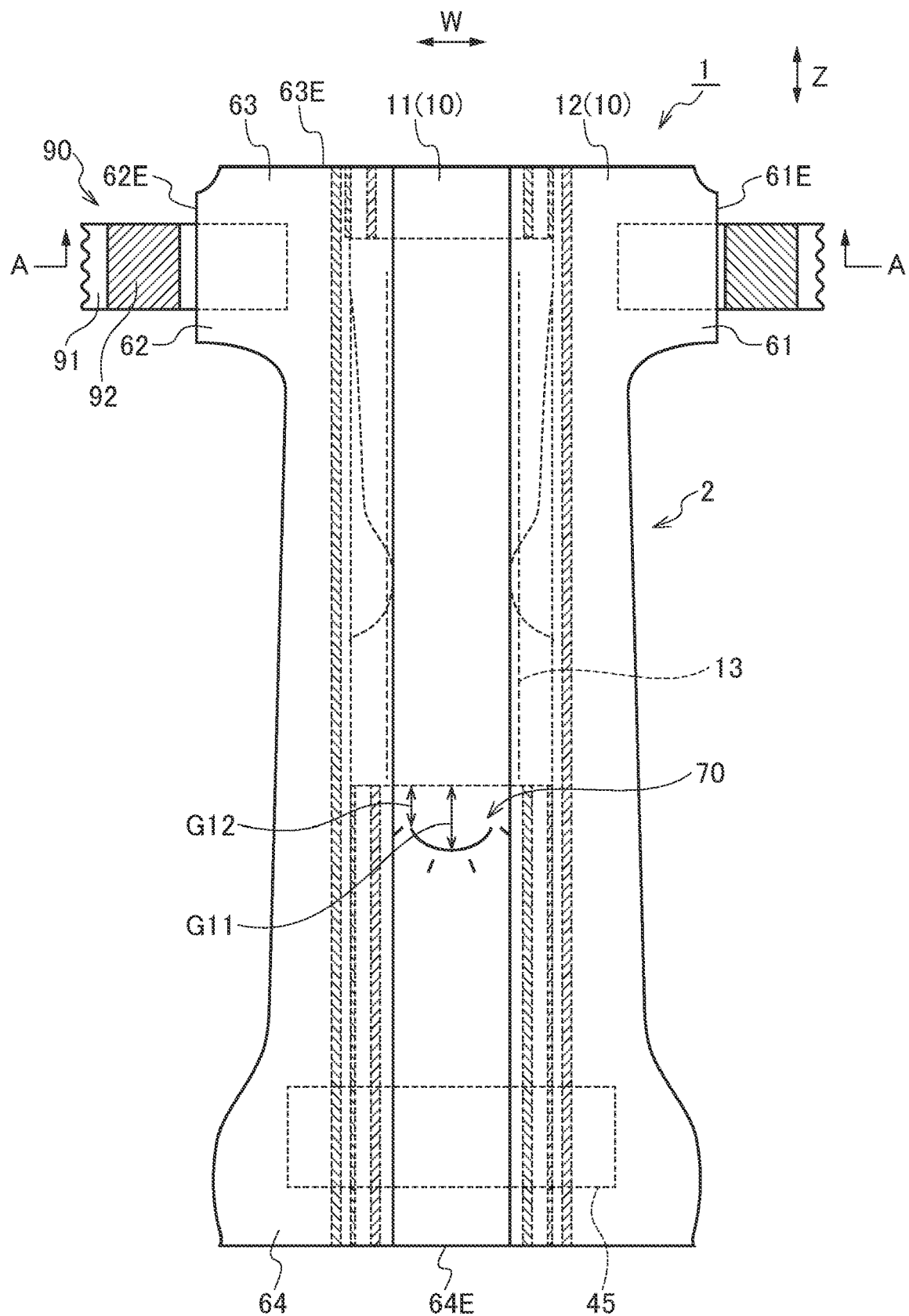
FIG. 1 is a plan view of a cat diaper according to one or more embodiments, seen from a skin surface side.

At least following matters will become clear with description of this specification and attached drawings.

A cat diaper of one or more embodiments has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted. The hole body portion bulges in a form of projection toward the stomach side or the back side. A length of the hole body portion in the lateral direction is not less than 1.90 times a length of the hole body portion in the longitudinal direction. According to one or more embodiments, the length of the hole body portion in the lateral direction is not less than 1.90 times the length of the hole body portion in the longitudinal direction, and the hole body portion has a laterally elongated shape. Therefore, due to the hole body portion, the tail hole opening is long in the lateral direction, which makes it difficult for the diaper from being displaced in the longitudinal direction. In addition, because the hole body portion is laterally elongated, even though the hole body portion is pulled in the longitudinal direction, the hole body portion is unlikely to widen in the longitudinal direction. Accordingly, the displacement of the diaper in the longitudinal direction that is caused by the widening of the hole body portion in the longitudinal direction can be inhibited.

According to one or more embodiments, the hole body portion may be in the shape of an arc that connects an apex and base end edges on both sides, the radius of curvature of the arc may be in a certain range, and the certain range may mean that the radius of curvature is uniform or mean that a difference between the maximum radius of curvature and the minimum radius of curvature is not more than 5% of the length of the hole body portion in the lateral direction. According to one or more embodiments, because the radius of curvature of the arc is within a certain range, the hole body portion can be inhibited from being deformed via an inflection point. Therefore, even in a case where the cat moves its tail up and down, the diaper is unlikely to be displaced in the longitudinal direction.

According to one or more embodiments, the hole body portion may be in the shape of an arc that connects an apex and base end edges on both sides, and an angle formed between a virtual line connecting the base end edges of the hole body portion and a tangent line of a rising portion rising from the base end edges toward the apex may be 80° or less. In a case where the hole body portion rises from the base end edges at a relatively large angle, the opening area of the tail hole is larger than that in a configuration in which the hole body portion rises at a small angle. Therefore, the positional deviation of tail is likely to occur in the tail hole, and the positional deviation of the diaper put on a cat is likely to occur. However, because the hole body portion rises at a relatively small angle from the base end edges, the positional deviation of tail is unlikely to occur in the tail hole, which makes it possible to inhibit the occurrence of positional deviation of the diaper put on a cat.

A cat diaper of one or more embodiments has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted. The hole body portion bulges in a form of projection toward the stomach side or the back side. The hole body portion is in the shape of an arc that connects an apex and base end edges on both sides. The radius of curvature of the arc is in a certain range. The certain range means that the radius of curvature is uniform or means that a difference between the maximum radius of curvature and the minimum radius of curvature is not more than 5% of a length of the hole body portion in the lateral direction. The angle formed between a virtual line that connects the base end edges of the hole body portion and a tangent line of a rising portion rising from the base end edges toward the apex is 80° or less. According to one or more embodiments, the displacement of the diaper in the longitudinal direction caused by the widening of the hole body portion in the longitudinal direction can also be inhibited.

According to one or more embodiments, the hole body portion may bulge in a form of projection toward the back side. Due to that, in a state where a cat is standing on four legs, gravity of the tail is unlikely to be exerted toward the apex of the hole body portion, which makes it possible to prevent the tail hole from widening due to the force concentration on the apex side of the hole body portion.

According to one or more embodiments, the hole body portion has an outer end edge (or a longitudinal outer edge) that is positioned on the outer side in the longitudinal direction and an inner end edge (or a longitudinal inner edge) that is positioned on a side of the absorbent core that is an inner side in the longitudinal direction, and the dimension of the hole body portion in the longitudinal direction is not less than 50% of the distance between the outer end edge of the hole body portion and the absorbent core. A male cat often has the nature of urinating as though spraying the urine. Therefore, in a case where a user puts a diaper on a cat, the user tends to more tightly put the diaper on the cat's body, than in a case where the user puts a diaper on a dog. In this case, the hole body portion is arranged in a region accounting for not less than 50% of the region between the outer end edge of the hole body portion and the absorbent core. Because the proportion of area occupied by the hole body portion is relatively high, even though the diaper is tightly put on, the area in which the tail can move can be secured, and the positional deviation of the entire diaper can be suppressed.

According to one or more embodiments, the center of the hole body portion in the longitudinal direction is positioned away from the midpoint between the center of the hole body portion in the lateral direction and the outer edge (or a lateral outer edge) of the hole body portion in the lateral direction toward the outer side in the lateral direction (positioned between the midpoint and the outer side in the lateral direction). Hereinafter, the phrasing "away from . . . toward" means "between." The midpoint is a point midway between the center of the hole body portion in the lateral direction and the lateral outer edge of the hole body portion. Unlike a configuration in which the center of the hole body portion in the longitudinal direction is positioned away from the midpoint toward the inner side in the lateral direction, in the present configuration, the center of the hole body portion in the longitudinal direction has shifted to the outer side in the lateral direction. Therefore, the hole body portion can secure the area while retaining the horizontally long shape. As a result, the deformation of the hole body portion can be suppressed.

According to one or more embodiments, the tail hole may be a portion where the top-surface sheet and the back-surface sheet are cut, and the tensile strength that at least one of the top-surface sheet and the back-surface sheet has along the longitudinal direction may be higher than the tensile strength that the one of the top-surface sheet and the back-surface sheet has along the lateral direction. According to one or more embodiments, because the tensile strength is high along the longitudinal direction, the tail hole opening is unlikely to widen in the longitudinal direction. Therefore, the displacement of the diaper in the longitudinal direction caused by the widening of the tail hole opening in the longitudinal direction can be suppressed.

A cat diaper of one or more embodiments has a lateral direction that is arranged along a waistline direction of a cat and a longitudinal direction that is orthogonal to the lateral direction and extends in a direction connecting a stomach side and a back side of the cat, the cat diaper comprising a body portion that has a top-surface sheet, a back-surface sheet, and an absorbent core arranged between the top-surface sheet and the back-surface sheet, and a tail hole that is formed in the body portion. The tail hole has a hole body portion through which the cat's tail is capable of being inserted, and a notch portion that increases the dimension of the hole body portion by communicating with the hole body portion. The notch portion has a lateral notch portion that is provided in a lateral region that extends to the outer side in the lateral direction from the hole body portion. Because the lateral notch portion is provided in a lateral region, the dimension of the tail hole (the hole body portion) can be increased in the lateral direction by the lateral notch portion. Therefore, even though the tail hole is pulled in the longitudinal direction, the tail hole opening is unlikely to widen in the lateral and longitudinal directions. Therefore, the displacement of the diaper in the longitudinal direction caused by the widening of the tail hole opening in the longitudinal direction can be suppressed.

According to one or more embodiments, the lateral notch portion may be provided only in the lateral region. That is, the lateral notch portion is arranged in the lateral region and is not arranged outside the lateral region. Because the lateral notch portion is provided only in the lateral region, the dimension of the formed lateral notch portion is not larger than the dimension of the hole body portion in the longitudinal direction. Therefore, the increase in dimension of the tail hole in the longitudinal direction caused by the lateral notch portion can be suppressed.

According to one or more embodiments, the notch portion may have a longitudinal notch portion provided in a longitudinal region that extends in the longitudinal direction from the hole body portion. The dimension of the tail hole can be increased in the longitudinal direction by the longitudinal notch portion. Because the notch portion includes the lateral notch portion and the longitudinal notch portion, the user can increase the dimension of the tail hole in a proper direction by appropriately selecting the direction.

According to one or more embodiments, a space between the longitudinal notch portion and the hole body portion may be longer than a space between the lateral notch portion and the hole body portion. Because the space between the longitudinal notch portion and the hole body portion is relatively long while the space between the lateral notch portion and the hole body portion is relatively short, in a case where an attempt is made to tear the body portion off the hole body portion so as to increase the dimension of the hole body portion, the torn portion is more likely to reach the lateral notch portion than to reach the longitudinal notch portion. Accordingly, it is easier to increase the dimension of the tail hole in the lateral direction by the lateral notch portion than to increase the dimension of the tail hole in the longitudinal direction by the longitudinal notch portion.

According to one or more embodiments, the hole body portion may be in the shape of an arc that connects an apex and base end edges on both sides, and a space between the longitudinal notch portion and each of the base end edges may be longer than a space between the lateral notch portion and each of the base end edges. Because the lateral notch portion is relatively close to the base end edges while the longitudinal notch portion is relatively far from the base end edges, in a case where force is applied to the base end edges of the hole body portion and the body portion is torn off the base end edges, the torn portion is more likely to reach the lateral notch portion than to reach the longitudinal notch portion. Accordingly, it is easier to increase the dimension of the tail hole in the lateral direction by the lateral notch portion than to increase the dimension of the tail hole in the longitudinal direction by the longitudinal notch portion.

According to one or more embodiments, the lateral notch portion may be arranged on a lateral extension line that extends in the lateral direction from the base end edges, and the longitudinal notch portion may be arranged at a position deviated from a longitudinal extension line that extends in the longitudinal direction from the base end edges. Because the lateral notch portion is arranged on a lateral extension line that extends in the lateral direction from the base end edges, and the longitudinal notch portion is not arranged on the longitudinal extension line that extends in the longitudinal direction from the base end edges, in a case where force is applied to the base end edges of the hole body portion and the body portion is torn off the base end edges, the torn portion is more likely to reach the lateral notch portion than to reach the longitudinal notch portion. Accordingly, it is easier to increase the dimension of the tail hole in the lateral direction by the lateral notch portion than to increase the dimension of the tail hole in the longitudinal direction by the longitudinal notch portion.

According to one or more embodiments, a distance between the longitudinal notch portion and the hole body portion in the longitudinal direction may be longer than the length of the longitudinal notch portion. Because the distance between the longitudinal notch portion and the hole body portion in the longitudinal direction is longer than the length of the longitudinal notch portion, the body portion is unlikely to be torn off the longitudinal notch portion in the longitudinal direction, which makes it possible to inhibit the dimension of the hole body portion from increasing in the longitudinal direction via the longitudinal notch portion.

According to one or more embodiments, the tail hole may be a portion where the top-surface sheet and the back-surface sheet are cut, and the tensile strength that at least one of the top-surface sheet and the back-surface sheet has along the longitudinal direction may be higher than the tensile strength that the one of the top-surface sheet and the back-surface sheet has along the lateral direction. According to one or more embodiments, because the tensile strength is high along the longitudinal direction, the tail hole opening is unlikely to widen in the longitudinal direction. Therefore, the displacement of the diaper in the longitudinal direction caused by the widening of the tail hole opening in the longitudinal direction can be suppressed.

(2) Configuration of Cat Diaper

Hereinafter, a cat diaper of one or more embodiments will be described with reference to the drawings. It should be noted that, in the following description of the drawings, identical or similar portions will be given identical or similar reference signs. Here, the drawings are schematic views, and attention needs to be paid to the fact that the ratios between individual dimensions and the like are different from actual ones. Therefore, specific dimensions and the like need to be determined with reference to the following description. In addition, there may be a portion where the relationship or ratio between dimensions varies between drawings.

Figure 2:
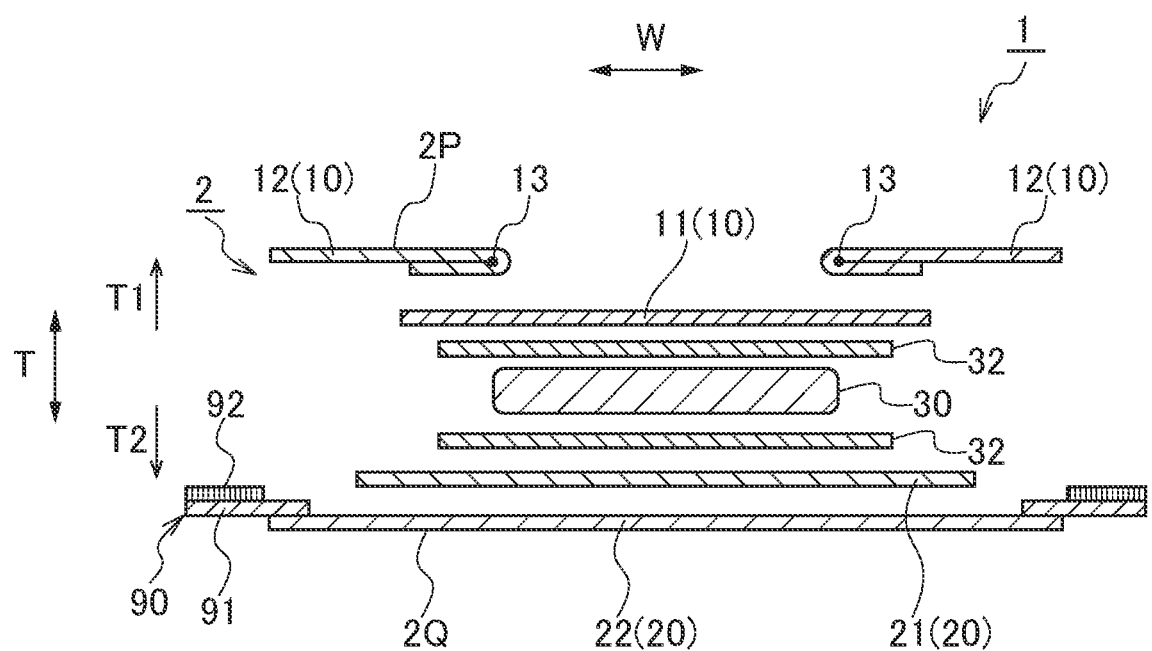
FIG. 2 is a schematic cross-sectional view of the cat diaper taken along a line A-A shown in FIG. 1.
Figure 3:
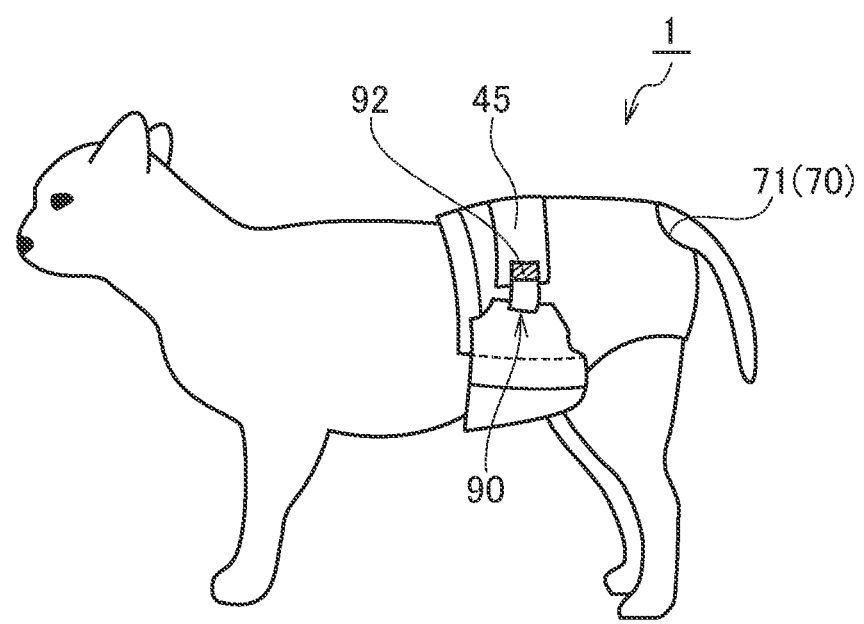
FIG. 3 is a view schematically showing a cat diaper according to one or more embodiments that is worn.

FIG. 1 is a plan view of a cat diaper according to one or more embodiments, seen from a top surface side T1. FIG. 2 is a schematic cross-sectional view of the cat diaper taken along a line A-A shown in FIG. 1. FIG. 1 and FIG. 2 show a cat diaper 1 in a stretched state in which the diaper is stretched until no wrinkles are formed. In the cross-sectional view shown in FIG. 2, for the convenience of description, members are spaced apart in a thickness direction T. However, in an actual product, the members are in contact with each other the thickness direction T. FIG. 3 is a view schematically showing the cat diaper worn by a cat.

The cat diaper 1 has a lateral direction W arranged along a waistline direction of a cat, a longitudinal direction Z orthogonal to the lateral direction W, and a thickness direction T orthogonal to the lateral direction W and the longitudinal direction Z. The longitudinal direction Z extends in a direction connecting the stomach side and the back side of a cat. The thickness direction T extends to a top surface side T1 that comes into contact with a cat when the cat is in the diaper and a back surface side T2 that is exposed to the outer side when the cat is in the diaper. As shown in FIG. 3, the cat diaper of one or more embodiments is put on so as to cover the region ranging from the stomach side to back side of the cat through the crotch of the cat.

The cat diaper 1 may have a body portion 2 and a fastening tape 90. The body portion 2 may have a first end portion 61 of the body that is one end portion in the lateral direction W, a second end portion 62 of the body that is the other end portion in the lateral direction W, a third end portion 63 of the body that is one end portion in the longitudinal direction Z, and a fourth end portion 64 of the body that is the other end portion in the longitudinal direction Z. The fastening tape 90 is joined to the first end portion 61 of the body and the second end portion 62 of the body. The third end portion 63 of the body is arranged on the stomach side of the cat in the diaper. The fourth end portion 64 of the body faces the third end portion 63 of the body and is arranged on the back side of the cat in the diaper. In one or more embodiments of the present invention, an end portion is a portion that occupies a certain area including end edges. The first end portion 61 of the body is a portion that extends in the inner side in the lateral direction W from a first end edge 61E that is one end edge of the body portion 2 in the lateral direction W. Likewise, the second end portion 62 of the body is a portion that extends in the inner side in the lateral direction W from a second end edge 62E that is the other end edge of the body portion 2 in the lateral direction W. The first end portion 61 of the body and the second end portion 62 of the body may be regions between end edges of the body portion 2 in the lateral direction W and end edges of the absorbent core 30 in the lateral direction W. The third end portion 63 of the body is a portion that extends on the inner side in the longitudinal direction Z from a third end edge 63E that is one end edge of the body portion 2 in the longitudinal direction Z. Likewise, the fourth end portion 64 of the body is a portion that extends on the inner side in the longitudinal direction Z from a fourth end edge 64E that is the other end edge of the body portion 2 in the longitudinal direction Z. The third end portion 63 of the body and the fourth end portion 64 of the body may be regions between end edges of the body portion 2 in the longitudinal direction Z and end edges of the absorbent core 30 in the longitudinal direction Z. The fourth end portion 64 of the body may be a region between an end edge of the body portion 2 in the longitudinal direction Z and an end edge of the absorbent core 30 in the longitudinal direction Z, or may be a region between an end edge of the body portion 2 in the longitudinal direction Z and a tail hole 70 that will be described later.

The body portion 2 has at least the top-surface sheet 10, the back-surface sheet 20, and the absorbent core 30. The top-surface sheet 10 is arranged on an inner surface 2P of the body portion 2 that is brought into contact with a cat. The top-surface sheet 10 has liquid permeability that enables a body fluid to permeate toward the absorbent core 30. The top-surface sheet 10 may have a center sheet 11 that is positioned at the center in the longitudinal direction Z and covers the absorbent core 30, and side sheets 12 that cover two side portions of the center sheet 11 in the lateral direction W. As shown in FIG. 2, the side sheets 12 may be folded. Specifically, the side sheets 12 are folded back toward the back surface side T2 at the inner edge of the side sheets 12 in the lateral direction W. Side stretchable members 13 being stretched in the longitudinal direction Z may be arranged between the folded side sheets 12. The side stretchable members 13 may configure a leak-proof gather that rises up toward the cat.

The absorbent core 30 is arranged between the top-surface sheet 10 and the back-surface sheet 20. The absorbent core 30 is formed by laminating absorbent materials such as pulp. As shown in FIG. 2, a core wrap 32 that covers the absorbent core 30 may be provided. The absorbent core 30 is arranged away from two end edges of the body portion 2 toward the inner side in the lateral direction W. That is, the length of the absorbent core 30 in the lateral direction W is smaller than the length of the body portion 2 in the lateral direction W. The absorbent core 30 is arranged at the center of the body portion 2 in the lateral direction W, and is not provided on the outer side portion of the body portion 2 in the lateral direction W. The absorbent core 30 may be arranged away from two end edges of the body portion 2 toward the inner side in the longitudinal direction Z. That is, the length of the absorbent core 30 in the longitudinal direction Z may be smaller than the length of the body portion 2 in the longitudinal direction Z. The absorbent core 30 may be arranged at the center of the body portion 2 in the longitudinal direction Z, and may not be provided in the outer side portion of the body portion 2 in the longitudinal direction Z. The absorbent core 30 may be spaced apart from the tail hole 70, which will be described later, in the longitudinal direction Z, and may be at a position closer to the stomach side than the tail hole 70.

The back-surface sheet 20 is arranged on an outer surface 2Q of the body portion 2 that is positioned on the outer side while the diaper is being worn. The back-surface sheet 20 may have a liquid-impermeable back-surface film 21 and a back-surface nonwoven fabric 22 positioned on a side closer to the back surface than the back-surface film 21. It should be noted that, in a modified example, the back-surface sheet may have a liquid-impermeable back-surface film and a back-surface nonwoven fabric positioned on a side closer to the inner surface than the back-surface film 21. The length of the back-surface film 21 in the lateral direction W may be smaller than the length of the back-surface nonwoven fabric 22 in the lateral direction W. That is, the back-surface nonwoven fabric 22 may extend further toward two sides in the lateral direction W than the back-surface film 21.

In the third end portion 63 of the body which is one end portion of the body portion 2 in the longitudinal direction Z, the fastening tape 90 extends further toward both outer sides in the lateral direction W than the body portion 2. More specifically, in the third end portion 63 of the body, the fastening tape 90 extends further toward the outer side in the lateral direction W than the first end edge 61E and the second end edge 62E of the body portion 2. The fastening tape 90 may have a base sheet 91 that is joined to the body portion 2, and a joining portion 92 that is provided on the base sheet 91 and capable of being joined to the outer surface 2Q of the body portion 2. The joining portion 92 is arranged on a surface of the fastening tape 90 that faces the top surface side T1. The joining portion 92 may be a mechanical fastener and is configured to be joinable to a target portion 45 provided on the outer surface 2Q of the body portion 2. It should be noted that, in a modified example, the body portion 2 may not include the target portion 45, and the joining portion 92 may be configured to be joined to the back-surface sheet 20 of the body portion 2 on the outer surface 2Q side. In a modified example, the joining portion may extend further toward two outer sides in the lateral direction W than the body portion 2 in the fourth end portion 64 of the body.

The cat diaper 1 may be provided with the tail hole 70. The tail hole 70 may have a hole body portion 71 through which the tail of a cat is capable of being inserted. When the diaper having the tail hole 70 is worn so that the buttocks and back of the cat are covered with the fourth end portion 64 of the body, the cat's tail may be inserted into the hole body portion 71 of the tail hole 70. The hole body portion 71 may be a semicircular notch. The hole body portion 71 may be a continuous notch or may have a configuration, such as a perforation, making it possible to tear off (or rip up) the top-surface sheet 10 and the back-surface sheet 20. The tail hole 70 may have a notch portion 72 that increases the dimension of the hole body portion 71 by communicating with the hole body portion 71. The notch portion 72 may have a configuration, such as a perforation, making it possible to tear off the top-surface sheet 10 and the back-surface sheet 20 and communicate the notch portion 72 to the hole body portion 71. The dimension of the hole body portion 71 can be adjusted according to the type and the growth process of a cat. Two notch portions 72 of one or more embodiments are provided on each of the left and right sides of the center of the tail hole 70 in the lateral direction W. In a modified example, one notch portion 72 may be provided on each of the left and right sides of the center of the tail hole 70 in the lateral direction W, or a configuration may be adopted in which two or more notch portions 72 may be provided so that the dimension of the tail hole 70 can be adjusted in multiple stages. The hole body portion 71 and the notch portion 72 may be portions where the top-surface sheet 10 and the back-surface sheet 20 are cut. The tail hole 70 will be specifically described later.

When the cat diaper 1 is put on a cat, the third end portion 63 of the body (the end portion on the side provided with the joining portion 92) is brought into contact with the cat's stomach. At this time, the fourth end portion 64 of the body is passed between two legs of the cat and extended toward the back of the cat. Then, the center of the body portion 2 in the longitudinal direction Z is brought into contact with the cat's urination opening, and at the same time, the cat's tail is slid through the tail hole 70 toward the back surface side T2 of the diaper. The buttocks and back of the cat are covered with the fourth end portion 64 of the body. Next, the joining portion 92 is pulled toward the back of the cat, and the joining portion 92 is fastened to the outer surface of the target portion 45 of the fourth end portion 64 of the body positioned on the back side. In this way, the cat diaper 1 can be put on so as to cover the stomach, back, and crotch of the cat as shown in FIG. 3. That is, the cat diaper 1 is worn so as to cover the region ranging from the stomach side to back side of the cat through the crotch of the cat.

Figure 4A:
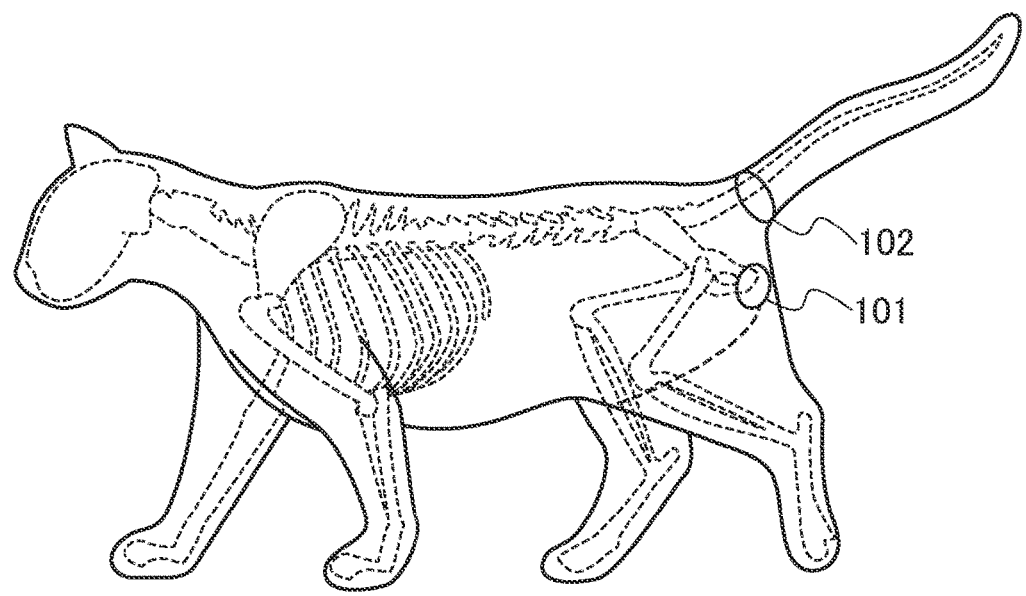
FIGS. 4A-4B are views each schematically showing the body shapes of a cat and a dog.
Figure 4B:
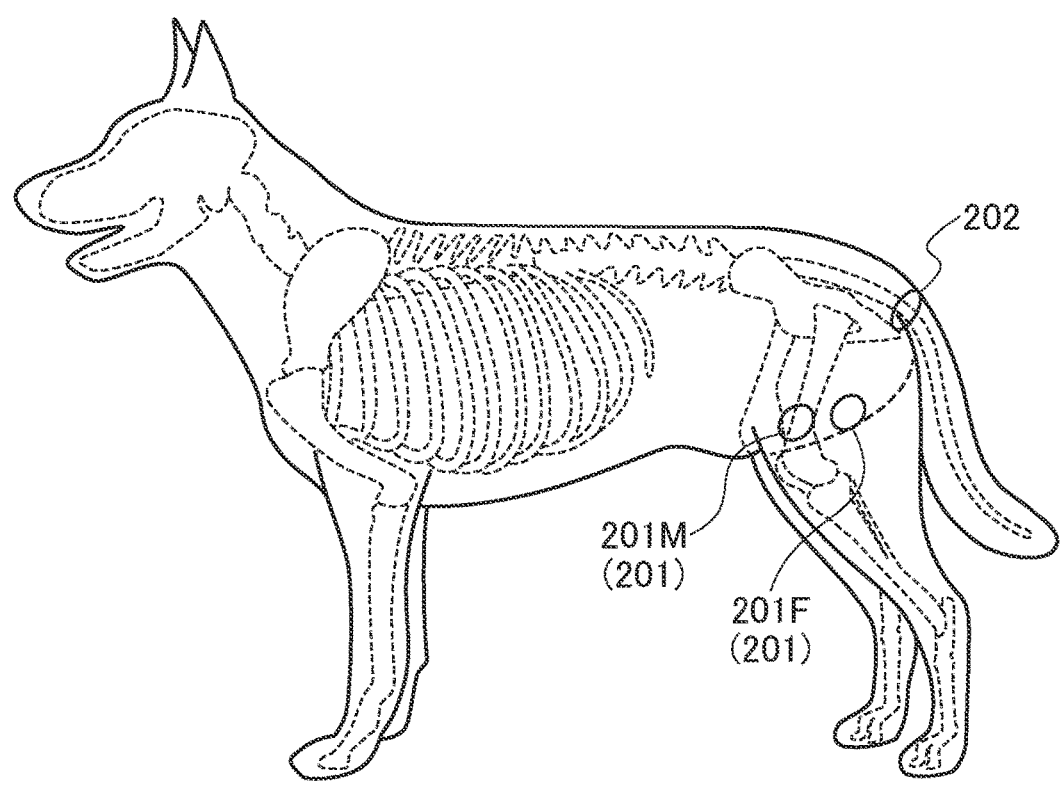
Figure 5:
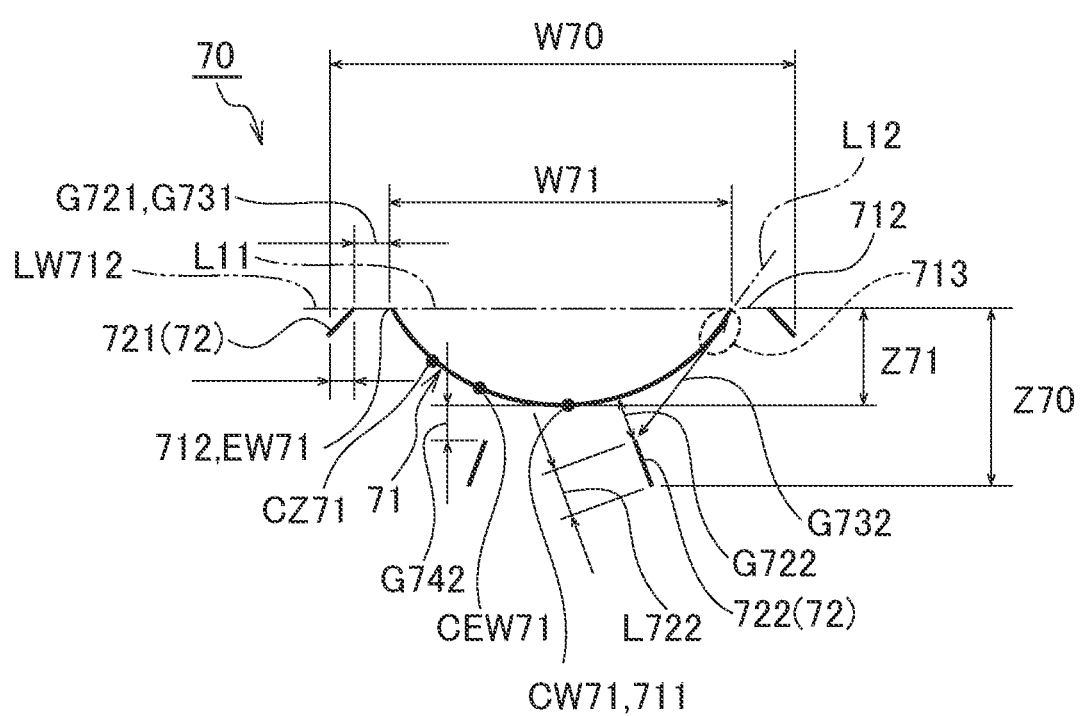
FIG. 5 is an enlarged plan view of a tail hole according to one or more embodiments.
Figure 6:
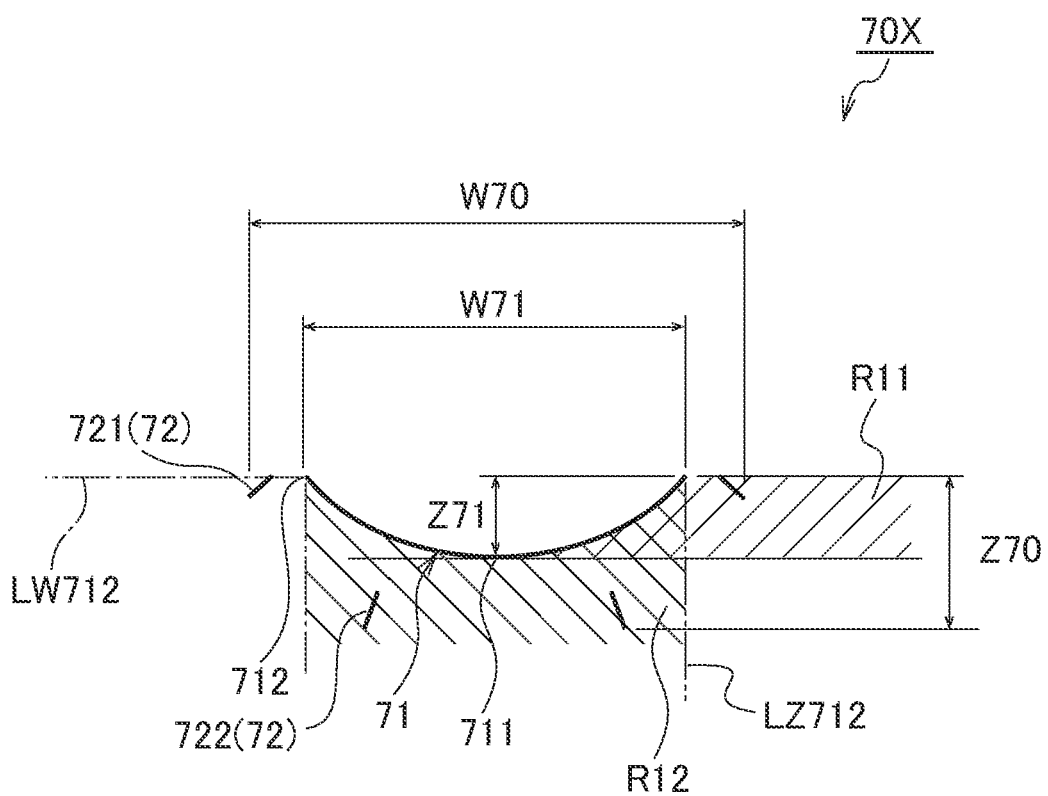
FIG. 6 is an enlarged plan view of a tail hole according to a modified example.

Next, the tail hole 70 will be specifically described with reference to FIGS. 4A to 6. FIGS. 4A-4B are views each schematically showing the body shapes of a cat and a dog. FIG. 4A shows the body shape of a cat, and FIG. 4B shows the body shape of a dog. FIG. 5 shows the tail hole 70 according to one or more embodiments, and FIG. 6 shows a tail hole 70X according to a modified example. Both the tail hole 70 of one or more embodiments and the tail hole 70X of the modified example have the hole body portion 71 and the notch portion 72 which have different shapes and are at different positions. However, the tail hole 70 of one or more embodiments and the tail hole 70X of the modified example are similar, and the same configuration for these will be given the same reference sign and will not be described again. The tail hole 70 of one or more embodiments may be a tail hole of a cat diaper to be put on a relatively small cat. The tail hole 70X according to the modified example may be a tail hole 70X of a cat diaper to be put on a relatively big cat.

First, a hole body portion 71 will be specifically described. The hole body portion 71 of one or more embodiments is configured to be not easily displaced in the longitudinal direction Z. As a result of intensive study, the applicant has found that usually, dogs tend to move their tails from side to side while cats tend to move their tails up and down. In addition, as a result of extensive investigation, the applicant has found that there is a big difference in the normal way of body movement between cats and dogs. Specifically, it has been found that, in many cases, while dogs tend to perform movement in a planar direction, such as running on the ground, cats tend to perform movement in a vertical direction, such as jumping up and down, unlike dogs. When trying to move its body in a vertical direction, a cat bends back legs and then instantly stretches them, or stretches the stomach or back that has been pulled in or hunched, as soon as it bends and stretches legs. Therefore, the stomach, the buttocks, and the skin around the legs is likely to stretch and contract much in the longitudinal direction Z. Therefore, it has been found that in a state where the cat is in the diaper, the tail hole 70 is pulled in the longitudinal direction Z, and the diaper is likely to be displaced in the longitudinal direction Z.

The applicant formed hole body portions by varying the ratio of the hole body portion 71 in the longitudinal direction Z and the lateral direction W, and investigated the relationship between the ratio of the hole body portion and the displacement in the longitudinal direction. For comparative evaluation, the cat diapers having the hole body portions according to Examples 1 to 6 and the cat diapers having the hole body portions according to Comparative Examples 1 to 8 were used and put on cats, and the positional relationship between the hole body portion and the cat's body as well as the displacement in the longitudinal direction in a state where the diaper is worn were checked. In a case where the urination portion was exposed through the hole body portion at a point in time when the diaper was just put on a cat, and the diaper was displaced in the longitudinal direction while being worn and thus the urination portion was exposed through the hole body portion, the diaper was evaluated as "x". In a case where the urination portion was not exposed through the hole body portion at a point in time when the diaper was just put on a cat, and the diaper was displaced in the longitudinal direction while being worn but the urination portion was not exposed through the hole body portion, the diaper was evaluated as "o". Furthermore, in a case where the urination portion was not exposed through the hole body portion at a point in time when the diaper is just put on a cat, and the diaper was displaced in the longitudinal direction while being worn but the urination portion was not exposed through the hole body portion and the tail was easily inserted into the hole body portion, the diaper was evaluated as "CD". It should be noted that cat diapers have the same configuration except for the hole body portion, and are in a state where the diapers are not opened by the notch portion. FIG. 7 shows the evaluation results.

As shown in the evaluation results in FIG. 7, a length W71 of the hole body portion 71 in the lateral direction W is greater than a length Z71 of the hole body portion 71 in the longitudinal direction Z, and may be not less than 1.90 times and preferably not less than 3.5 times the length Z71 of the hole body portion 71 in the longitudinal direction Z. In a state where a cat is in the diaper, the cat's tail is caught at the apex of the hole body portion 71, which restricts the movement in the longitudinal direction Z. In a case where the length Z71 of the hole body portion 71 in the longitudinal direction Z is relatively great, the length of the tail hole opening in the longitudinal direction Z increases, which leads to a risk that the diaper will be displaced in the longitudinal direction Z and the urination opening will be exposed. At this time, because the length W71 of the hole body portion 71 in the lateral direction W is not less than 1.90 times the length Z71 of the hole body portion 71 in the longitudinal direction Z, and the hole body portion 71 has a shape elongated in the lateral direction W, the tail hole opening is elongated in the lateral direction W by the hole body portion 71, and the diaper is unlikely to be displaced in the longitudinal direction Z. The length W71 of the hole body portion 71 of one or more embodiments in the lateral direction W is 28.3 mm, the length Z71 of the hole body portion 71 in the longitudinal direction Z is 8 mm, and the ratio of the length W71 of the hole body portion 71 in the lateral direction W to the length Z71 of the hole body portion 71 in the longitudinal direction Z is 3.53. The length W71 of the hole body portion 71 according to the modified example in the lateral direction W is 36.7 mm, the length Z71 of the hole body portion 71 in the longitudinal direction Z is 8 mm, and the ratio of the length W71 of the hole body portion 71 in the lateral direction W to the length Z71 of the hole body portion 71 in the longitudinal direction Z is 4.58. In order to suppress the displacement of the diaper in the lateral direction, the length W71 of the hole body portion 71 in the lateral direction W may be not more than 6.3 times and preferably not more than 5.0 times the length Z71 of the hole body portion 71 in the longitudinal direction Z. Furthermore, in order to suppress the displacement of the cat diaper in the longitudinal direction Z while allowing the tail to be accommodated, the length Z71 of the hole body portion 71 in the longitudinal direction Z may be 5.5 mm or more and 10.0 mm or less, and preferably 5.5 mm or more and 8.0 mm or less. Furthermore, in order to suppress the displacement of the cat diaper in the lateral direction W while allowing the tail to be accommodated, the length W71 of the hole body portion 71 in the lateral direction W may be 10.0 mm or more and 36.7 mm or less, and preferably 28.3 mm or more and 36.7 mm or less.

As shown in FIGS. 4A-4B, usually, the distance between a urination opening 101 and a tail 102 in a cat is often shorter than the distance between a urination opening 201 and a tail 202 in a dog. More specifically, a urination opening 201F of a female dog is close to the tail 202, but a urination opening 201M of a male dog is farther from the tail 202 than the female. In the case of a cat, there is no big difference in the position of the urination opening in the longitudinal direction Z between male and female, and the urination opening of both the male and female is at a position close to the tail 102. Because the hole body portion 71 is elongated in the lateral direction W, even though the hole body portion 71 is pulled in the longitudinal direction Z, the opening is unlikely to widen in the longitudinal direction Z by the hole body portion 71. Therefore, the displacement of the diaper in the longitudinal direction Z resulting from the widening of the opening in the longitudinal direction Z by the hole body portion 71 can be suppressed.

The hole body portion 71 may be in the shape of an arc that connects an apex 711 and base end edges 712 on both sides. The radius of curvature of the arc is within a certain range. The radius of curvature in a certain range means that the radius of curvature is uniform or means that a difference between the maximum radius of curvature and the minimum radius of curvature is not more than 5% of the length W71 of the hole body portion 71 in the lateral direction W. The radius of curvature of the hole body portion 71 of one or more embodiments is 16.6 mm, and the radius of curvature of the hole body portion 71 of the modified example is 25.0 mm. In a state where a cat is in the diaper, the cat's tail is caught at the apex 711 of the hole body portion 71, which restricts the movement in the longitudinal direction Z. In a case where the radius of curvature of the arc as the hole body portion 71 changes, there is a risk that force will be concentrated on the inflection point where the radius of curvature changes, the hole body portion 71 will be deformed via the inflection point, the diaper will be displaced, and the urination opening will be exposed. As described above, usually, dogs tend to move their tails from side to side while cats tend to move their tails up and down. In addition, the distance between the urination opening 101 and the tail 102 is shorter in a cat than in a dog. Therefore, in a state where the cat is in the diaper, the tail hole is pulled in the longitudinal direction Z, and the diaper is likely to be displaced in the longitudinal direction Z. According to the present configuration, the radius of curvature of the arc is within a certain range. Therefore, the deformation of the hole body portion 71 via the inflection point is suppressed, and even though the tail hole 70 is pulled in the longitudinal direction Z, the opening of the tail hole 70 is unlikely to widen in the longitudinal direction Z. As a result, the displacement of the diaper in the longitudinal direction Z resulting from the widening of the opening of the tail hole 70 in the longitudinal direction Z can be suppressed.

The applicant formed hole body portions by varying the angle formed between a virtual line L11 connecting base end edges 712 of the hole body portion 71 and a tangent line L12 of a rising portion 713 rising from the base end edges 712 toward an apex 711, and investigated the relationship between the angle of the hole body portion and the deformation of the hole body portion. For comparative evaluation, the cat diapers having the hole body portions according to Examples 7 to 13 and the cat diapers having the tail hole portions according to Comparative Examples 9 to 15 were used and put on cats, and how the hole body portion was deformed 30 minutes after the diapers were put on was checked. In a case where the deformation causing the hole body portion to stretch in the longitudinal direction occurred 30 minutes after the diaper was put on, the diaper was evaluated as "x". In a case where the deformation causing the hole body portion to stretch in the longitudinal direction did not occurred 30 minutes after the diaper was put on, but it was difficult to insert the tail when putting the diaper on, the diaper was evaluated as "O". In a case where the deformation causing the hole body portion to stretch in the longitudinal direction did not occur 30 minutes after the diaper was put on, and it was easy to insert the tail when putting the diaper on, the diaper was evaluated as "CD". FIG. 8 shows the evaluation results.

As shown in the evaluation result in FIG. 8, the angle formed between the virtual line L11 connecting the base end edges 712 of the hole body portion 71 and a tangent line L12 of the rising portion 713 rising from the base end edges 712 toward the apex 711 may be 80° or less. The rising portion 713 is a portion that includes the base end edges 712 and rises from the base end edges 712 toward the apex 711. For example, a range of 5 mm from the base end edges 712 may be extracted, and a line connecting the end portions (each of the base end edges and a position 5 mm distant from the base end edge) of the 5 mm long arc portion may be adopted as the tangent line L12. In a case where the hole body portion 71 rises from the base end edges 712 at a relatively large angle, the opening area of the hole body portion 71 further increases than in a case where the hole body portion 71 is configured to rise at a small angle. As a result, the positional deviation of tail is likely to occur in the tail hole, and the positional deviation of diaper is likely to occur. However, because the hole body portion 71 rises from the base end edges 712 at a relatively small angle, the positional deviation of the tail is unlikely to occur in the tail hole, which makes it possible to inhibit the positional deviation of the diaper put on a cat. Furthermore, in order to smoothly insert the tail, the angle may be 35° or more.

The hole body portion 71 may bulge in a form of projection toward the back side. As shown in FIGS. 4A-4B, in a state where a cat is standing on four legs, the gravity of the tail is exerted to the stomach-side end edge of the hole body portion 71. A pair of base end edges 712 is arranged on the stomach-side end edge of the hole body portion 71, and the body portion 2 is turned up along the virtual line L11 connecting the base end edges 712. Therefore, the gravity of the tail is exerted on the entire virtual line L11. Accordingly, in this configuration, the gravity of tail is further inhibited from being locally concentrated and the deformation of the hole body portion 71 can be further suppressed, than in a configuration in which the apex 711 of the hole body portion 71 is arranged on the stomach-side end edge of the hole body portion 71. Therefore, the tail hole 70 can be prevented from widening due to the force concentration on the apex side of the hole body portion 71.

The hole body portion 71 has an outer end edge that is positioned on the outer side in the longitudinal direction Z and an inner end edge that is positioned on a side of the absorbent core that is the inner side in the longitudinal direction Z. The outer end edge may be a back-side end edge. In one or more embodiments, the outer end edge is the apex 711. The inner end edge may be a stomach-side end edge. In one or more embodiments, the inner end edge is the base end edges 712 and the virtual line L11. The dimension of the hole body portion 71 in the longitudinal direction Z may be not less than 50% of a distance G11 (see FIG. 1) between the apex 711, which is the outer end edge of the hole body portion 71, and the absorbent core 30. In other words, a distance G12 (see FIG. 1) between each of the base end edges 712, which are the inner end edges of the hole body portion 71, and the absorbent core 30 may be less than 50% of the distance G11. A male cat often has the nature of urinating as though spraying the urine. Therefore, in a case where a user puts a diaper on a cat, the user tends to more tightly put the diaper on the cat's body, than in a case where the user puts a diaper on a dog. At this time, the hole body portion 71 is arranged in a region accounting for not less than 50% of the region between the outer end edge of the hole body portion 71 and the absorbent core 30. Because the proportion of area occupied by the hole body portion 71 is relatively high, even though the diaper is tightly put on, the area in which the tail can move can be secured, and the positional deviation of the entire diaper can be suppressed.

A center CZ71 of the hole body portion 71 in the longitudinal direction Z may be positioned away from a midpoint CEW71 between a center CW71 of the hole body portion 71 in the lateral direction W and an outer edge EW71 of the hole body portion 71 in the lateral direction W toward the outer side in the lateral direction W. In one or more embodiments, the center CW71 of the hole body portion 71 in the lateral direction W is the apex 711, and the outer edge EW71 of the hole body portion 71 in the lateral direction W is the base end edge 712. The length of the arc-shaped hole body portion 71 in the longitudinal direction Z is great at the center CW71, at which the apex 711 is arranged, of the hole body portion 71 in the lateral direction W, and decreases toward the outer side in the lateral direction W from the center CW71 of the hole body portion 71 in the lateral direction W. Unlike a configuration in which the center CZ71 of the hole body portion 71 in the longitudinal direction Z is positioned away from the midpoint CEW71 toward the inner side in the lateral direction W, in the configuration of one or more embodiments, the center of the hole body portion 71 in the longitudinal direction Z has shifted to the outer side in the lateral direction W. Therefore, the hole body portion 71 can secure the area while retaining the horizontally long shape. As a result, the deformation of the hole body portion 71 can be suppressed. Furthermore, in a case where the center CZ71 of the hole body portion 71 in the longitudinal direction Z is positioned away from the midpoint CEW71 toward the inner side in the lateral direction W, the region where the hole body portion 71 secures the length in the longitudinal direction Z is locally provided on the midpoint CEW71 side, which leads to a risk that force will be concentrated and deformation will occur in the longitudinal direction Z. However, because the region where the hole body portion 71 secures the length in the longitudinal direction Z can be arranged away from the midpoint CEW71 toward the outer side in the lateral direction W, the entire hole body portion 71 can receive the force generated by the tail movement or the like, which makes it possible to suppress the deformation of the hole body portion 71.

According to the conventional technique described above (for example, Japanese Patent Application Publication No. 2013-9657), because the tail hole is deformed so as to be closed by the contraction of the elastic member, the tail hole opening easily fits the tail. However, because the thickness of tail varies with the type or individual difference of the pet, in a case where the hole is too large for the tail, there is a possibility that a gap will occur when the pet changes the body position, and thus leakage will occur. In addition, in a case where the hole is too small for the tail, unfortunately, it is difficult to put the diaper on the pet. To deal with this issue, another conventional technique (for example, Japanese Patent Application Publication No. H07-236380) discloses a pet diaper provided with a long-groove-shaped notch portion communicating with a tail hole for a pet's tail to pass through, in which a tape supporting band is provided in the vicinity of a portion separated by the long-groove-shaped notch portion so as to prevent the leakage from a gap by fitting the tail hole to the tail in a manner of tightening the tape supporting band in a case where the tail hole is larger than the tail.

The aforementioned pet diaper of the conventional technique is configured so that the diaper can be put on both the dogs and cats. However, as a result of extensive investigation, the applicant has found that the distance between the excretion opening and the tail is shorter in cats than in dogs in many cases. Therefore, in a case where a cat wears a diaper that suits the body shape of a dog, sometimes the position of tail does not match the position of tail hole in the longitudinal direction of the diaper put on, and the tail hole widens too much in the longitudinal direction. Due to that, in a case where a cat wears the pet diaper designed for a dog, sometimes the diaper is displaced when the cat is in the diaper, and leakage occurs. The long-groove-shaped notch portion of the pet diaper of Patent Literature 2 extends in the front-rear direction. Therefore, in a case where an attempt is made to enlarge the tail hole, the tail hole inevitably has a vertically long shape, and the diaper is likely to be displaced in the longitudinal direction while being worn. Especially, a male cat often has the nature of urinating as though spraying the urine. In a case where a cat in a displaced diaper sprays urine, the urine is scattered in all directions. Therefore, there is a demand for a cat diaper that is not easily displaced in the longitudinal direction while being worn. The cat diaper of one or more embodiments was made in light of the above issue, and is configured so that the diaper is not easily displaced in the longitudinal direction while being worn.

Next, a configuration by which the diaper is not easily displaced in the longitudinal direction while being worn will be described. More specifically, the notch portion 72 will be described in detail. Before the diaper is used, the notch portion 72 is spaced apart from the hole body portion 71. Cutting the body portion 2 in the region between the hole body portion 71 and the notch portion 72 makes it possible to increase the dimension of the hole body portion 71. The notch portion 72 may have a pair of lateral notch portions 721 and a pair of longitudinal notch portions 722. In one or more embodiments, the diaper is configured so that the displacement of the diaper in the lateral direction is suppressed even though the dimension of the tail hole is increased by the notch portion 72. A length W70 of the tail hole (hole body portion 71+notch portion 72) in the lateral direction W is greater than a length Z70 of the tail hole 70 in the longitudinal direction Z, and may be not less than 1.90 times and preferably not less than 3.5 times the length Z70 of the tail hole 70 in the longitudinal direction Z. The length W70 of the tail hole 70 of one or more embodiments in the lateral direction W is 38.6 mm, the length Z70 of the tail hole 70 in the longitudinal direction Z is 14.7 mm, and the ratio of the length W70 of the tail hole 70 in the lateral direction W to the length Z70 of the tail hole 70 in the longitudinal direction Z is 2.625. The length W70 of the tail hole 70X according to a modified example in the lateral direction W is 46.9 mm, the length Z70 of the tail hole 70X in the longitudinal direction Z is 14.7 mm, and the ratio of the length W70 of the tail hole 70 in the lateral direction W to the length Z70 of the tail hole 70X in the longitudinal direction Z is 3.19. In order to suppress the displacement of the diaper in the lateral direction, the length W70 of the tail hole 70 in the lateral direction W may be not more than 6.3 times and preferably 5.0 times the length Z70 of the tail hole 70 in the longitudinal direction Z. In addition, the length Z70 of the tail hole 70 in the longitudinal direction Z may be 5.5 mm or more and 15.0 mm or less. Furthermore, in order to suppress the displacement of the diaper in the lateral direction W while allowing the tail to be accommodated, the length W70 of tail hole 70 in the lateral direction W may be 10.0 mm or more and 46.9 mm or less.

The notch portion 72 may have the lateral notch portion 721 provided in a lateral region R11 that extends to the outer side in the lateral direction W from the hole body portion 71. The lateral region R11 is positioned away from the hole body portion 71 toward the outer side in the lateral direction W. The position of the lateral region R11 in the longitudinal direction Z coincides with the position of the hole body portion 71 in the longitudinal direction Z. In FIG. 6, the lateral region R11 is represented by diagonal lines. Because the lateral notch portion 721 is provided in the lateral region R11, the dimension of the tail hole 70 can be increased in the lateral direction W by the lateral notch portion 721. In a configuration in which the dimension of the tail hole 70 is increased only in the longitudinal direction Z as in the related art, in a case where an attempt is made to enlarge the tail hole 70, the tail hole 70 inevitably has a vertically long shape, and the diaper is likely to be displaced in the longitudinal direction Z while being worn. As described above, usually, dogs tend to move their tails from side to side while cats tend to move their tails up and down. Therefore, in a state where the cat is in the diaper, the tail hole is pulled in the longitudinal direction, and the diaper is likely to be displaced in the longitudinal direction. Accordingly, in a case where the dimension of the tail hole is increased in the longitudinal direction, there is a risk that the diaper will be displaced in the longitudinal direction and the urination opening will be exposed. However, because the dimension of the tail hole 70 can be increased in the lateral direction W by the lateral notch portion 721, even though the tail hole 70 is pulled in the longitudinal direction Z, the opening of the tail hole 70 widens in the lateral direction W and is unlikely to widen in the longitudinal direction Z. As a result, the displacement of the diaper in the longitudinal direction Z resulting from the widening of the opening of the tail hole 70 in the longitudinal direction Z can be suppressed. In addition, because the dimension of the tail hole 70 is increased in the lateral direction W by the lateral notch portion 721, the opening of the tail hole 70 can be enlarged, and the tail hole 70 fits better when put on the tail.

The lateral notch portion 721 may be provided only in the lateral region R11. That is, the lateral notch portion 721 may not extend further toward the outer side in the longitudinal direction Z than the lateral region R11. Because the lateral notch portion 721 is provided only in the lateral region R11, the formed lateral notch portion 721 is not larger than the dimension of the hole body portion 71 in the longitudinal direction Z. Accordingly, the increase in dimension of the tail hole 70 in the longitudinal direction Z caused by the lateral notch portion 721 can be suppressed. The lateral notch portion 721 may be spaced apart from the outer edge EW71 of the hole body portion 71 and positioned away from the outer edge EW71 of the hole body portion 71 toward the outer side in the lateral direction W.

The notch portion 72 may have the longitudinal notch portions 722 provided in a longitudinal region R12 that extends in the longitudinal direction Z from the hole body portion 71. The longitudinal region R12 is positioned away from the hole body portion 71 toward the outer side in the longitudinal direction Z, and the position of the longitudinal region R12 in the lateral direction W coincides with the position of the hole body portion 71 in the lateral direction W. In FIG. 6, the longitudinal region R12 is represented by diagonal lines. The dimension of the tail hole can be increased in the longitudinal direction Z by the longitudinal notch portion 722. Because the notch portion includes the lateral notch portion 721 and the longitudinal notch portion 722, the user can increase the dimension of the tail hole in a proper direction by appropriately selecting the direction. The longitudinal notch portion 722 may be spaced apart from the apex 711 which is the outer end edge of the hole body portion 71, and may be positioned away from the apex 711, which is the outer end edge of the hole body portion 71, toward the outer side in the longitudinal direction Z.

A space G722 between the longitudinal notch portion 722 and the hole body portion 71 may be longer than a space G721 between the lateral notch portion 721 and the hole body portion 71. Because the space G722 between the longitudinal notch portion 722 and the hole body portion 71 is relatively long while the space G721 between the lateral notch portion 721 and the hole body portion 71 is relatively short, in a case where an attempt is made to tear the body portion 2 off the hole body portion 71 so as to increase the dimension of the hole body portion 71, the torn portion is more likely to reach the lateral notch portion 721 than to reach the longitudinal notch portion 722. Accordingly, it is easier to increase the dimension of the tail hole 70 in the lateral direction W by the lateral notch portion 721 than to increase the dimension of the tail hole 70 in the longitudinal direction by the longitudinal notch portion 722.

A space G732 between the longitudinal notch portion 722 and each of the base end edges 712 may be longer than a space G731 between the lateral notch portion 721 and each of the base end edges 712. In the arc-shaped hole body portion 71, when the tail is inserted into the hole body portion 71 or the tail moves in the hole body portion 71, force is likely to be applied to the base end edges 712. Because the lateral notch portion 721 is relatively close to the base end edges 712 while the longitudinal notch portion 722 is relatively far from the base end edges 712, when force is applied to the base end edges 712 of the hole body portion 71 and the body portion 2 is torn off the base end edges 712, the torn portion is more likely to reach the lateral notch portion 721 than to reach the longitudinal notch portion 722. Accordingly, it is easier to increase the dimension of the tail hole 70 in the lateral direction W by the lateral notch portion 721 than to increase the dimension of the tail hole 70 in the longitudinal direction by the longitudinal notch portion 722.

The lateral notch portion 721 may be arranged on a lateral extension line LW712 that extends in the lateral direction W from the base end edges 712. The longitudinal notch portion 722 may be arranged at a position deviated from above a longitudinal extension line LZ712 that extends in the longitudinal direction Z from the base end edges 712. FIG. 6 shows the lateral extension line LW712 and the longitudinal extension line LZ712. The inner edge of the lateral notch portion 721 in the lateral direction W is positioned away from the outer edge of the lateral notch portion 721 in the lateral direction W toward the inner side in the longitudinal direction Z, and is arranged on the lateral extension line LW712. The inner edge of the longitudinal notch portion 722 in the lateral direction W is positioned away from the outer edge of the longitudinal notch portion 722 in the lateral direction W toward the inner side in the longitudinal direction Z. Both the inner edge and outer edge of the longitudinal notch portion 722 in the lateral direction W are arranged away from the longitudinal extension line LZ712 toward the inner side in the lateral direction W. The force applied to the base end edges 712 is likely to be transmitted in the lateral direction W and the longitudinal direction Z, which are the directions along which fibers of the sheet are arrayed or each member extends. Because the lateral notch portion 721 is arranged on the lateral extension line LW712 that extends in the lateral direction W from the base end edges 712, and the longitudinal notch portion 722 is not arranged on the longitudinal extension line LZ712 that extends in the longitudinal direction Z from the base end edges 712, in a case where force is applied to the base end edges 712 of the hole body portion 71 and the body portion 2 is torn off the base end edges 712, the torn portion is more likely to reach the lateral notch portion 721 than to reach the longitudinal notch portion 722. Accordingly, it is easier to increase the dimension of the tail hole 70 in the lateral direction W by the lateral notch portion 721 than to increase the dimension of the tail hole 70 in the longitudinal direction by the longitudinal notch portion 722.

A distance G742 between the longitudinal notch portion 722 and the hole body portion 71 in the longitudinal direction Z may be longer than a length L722 of the longitudinal notch portions 722. Generally, the greater the length of the notch portion 72, the more likely it is for the tail hole to be torn from the notch portion 72 toward the surrounding area, and the smaller the length of the notch portion 72, the less likely it is for the tail hole to be torn from the notch portion 72 toward surrounding area. In addition, the shorter the space between the notch portion 72 and the hole body portion 71, the more likely it is for the tail hole to be torn from the hole body portion 71 toward the notch portion 72, and the longer the space between the notch portion 72 and the hole body portion 71, the less likely it is for the tail hole to be torn from the hole body portion 71 toward the notch portion 72. The distance G742 between the longitudinal notch portion 722 and the hole body portion 71 in the longitudinal direction Z is longer than the length L722 of the longitudinal notch portion. Therefore, the tail hole is unlikely to be torn in the longitudinal direction from the longitudinal notch portion, which makes it possible to suppress the increase of the dimension in the longitudinal direction via the longitudinal notch portion.

The tensile strength that at least one of the top-surface sheet 10 and the back-surface sheet 20 has in the longitudinal direction Z may be higher than the tensile strength that one of the top-surface sheet and the back-surface sheet has in the lateral direction W. The hole body portion 71 is a portion where the top-surface sheet 10 and the back-surface sheet 20 are cut. At least one of the top-surface sheet 10 and the back-surface sheet 20 has high tensile strength along the longitudinal direction Z. Therefore, the tail hole opening is unlikely to widen in the longitudinal direction Z. Accordingly, the displacement of the diaper in the longitudinal direction Z caused by the widening of the tail hole opening in the longitudinal direction Z can be suppressed.

The tensile strength of the sheet can be measured by the following method. (1) A tensile tester is prepared, and an inter-chuck distance and a chuck tensile rate are set to 40 mm and 100 mm/min, respectively. (2) A sample is cut in 100 mm×25 mm (longitudinal direction×lateral direction). (3) One end portion of the sample in the longitudinal direction is set in the upper chuck of the tensile tester so that the end portion is interposed between chucks up to a depth of about 10 mm. (4) Likewise, the other end portion of the sample in the longitudinal direction is set in the lower chuck of the tensile tester so that the other end portion is interposed between chucks up to a depth of about 10 mm. (5) A tensile test is started at a chuck tensile rate of 100 mm/min, and the tensile test is performed until the sample breaks. (6) The maximum tensile strength obtained while displacement of up to 150 mm occurs is recorded. (7) The above operation is repeated four more times, and the average of the maximum tensile strengths obtained by a total of five tests is calculated. Examples of the above tensile tester include an autograph-type tensile tester AG-1KNI manufactured by Shimadzu Corporation.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

A cat diaper that is not easily displaced while being worn can be provided.

REFERENCE SIGNS LIST

1: cat diaper, 2: body portion, 10: top-surface sheet, 20: back-surface sheet, 30: absorbent core, 70, 70X: tail hole, 71: hole body portion, 711: apex, 712: base end edge, 713: rising portion, 72: notch portion, 721: lateral notch portion, 722: longitudinal notch portion, 90: fastening tape, W: lateral direction, Z: longitudinal direction, R11: lateral region, R12: longitudinal region

What is claimed is:

1. A cat diaper having a lateral direction along a waistline of a cat and a longitudinal direction orthogonal to the lateral direction, the cat diaper comprising:
   a body portion that has a top-surface sheet, a back-surface sheet, and an absorbent core disposed between the top-surface sheet and the back-surface sheet; and
   a tail hole formed in the body portion, wherein
   the tail hole comprises:
      a hole body through which a tail of the cat is inserted;
      a lateral notch that increases a lateral length of the hole body by communicating with the hole body; and
      a longitudinal notch that increases a longitudinal length of the hole body by communicating with the hole body,
   the hole body bulges toward a stomach side or a back side of the cat diaper,
   the lateral length of the hole body is not less than 1.90 times the longitudinal length of the hole body, and
   a lateral length of the tail hole including the hole body and the lateral notch is greater than a longitudinal length of the tail hole including the hole body and the longitudinal notch.

2. The cat diaper according to claim 1, wherein
the hole body:
   includes an apex, and base end edges on both sides, and
   has an arc shape connecting the apex and the base end edges, wherein the arc shape has a radius of curvature within a certain range, and
the radius of curvature is within the certain range in the case that:
   the radius of curvature is uniform, or
   the certain range is a range between a maximum radius of curvature and a minimum radius of curvature, wherein the difference between the maximum radius and the minimum radius is not more than 5% of the lateral length of the hole body.

3. The cat diaper according to claim 1, wherein
the hole body:
   includes an apex, and base end edges on both sides, and
   has an arc shape connecting the apex and the base end edges, and
an angle formed between a virtual line and a tangent line of a rising portion is 80° or less, wherein the virtual line connects the base end edges and the rising portion rises from each of the base end edges toward the apex.

4. The cat diaper according to claim 1, wherein
the hole body bulges toward the back side.

5. The cat diaper according to claim 1, wherein
the hole body has:
   a longitudinal outer edge on an outer side in the longitudinal direction, and
   a longitudinal inner edge on a side of the absorbent core and on an inner side in the longitudinal direction, and
the longitudinal length of the hole body is not less than 50% of a distance between the longitudinal outer edge and the absorbent core.

6. The cat diaper according to claim 1, wherein
a center of the hole body in the longitudinal direction is positioned between a midpoint and an outer side of the body portion in the lateral direction, and
the midpoint is a point midway between a center of the hole body in the lateral direction and a lateral outer edge of the hole body.

7. The cat diaper according to claim 1, wherein
the tail hole is a portion where the top-surface sheet and the back-surface sheet are cut, and
a longitudinal tensile strength of at least one of the top-surface sheet and the back-surface sheet is higher than a lateral tensile strength of the one of the top-surface sheet and the back-surface sheet.

8. A cat diaper having a lateral direction along a waistline of a cat and a longitudinal direction orthogonal to the lateral direction, the cat diaper comprising:
   a body portion that has a top-surface sheet, a back-surface sheet, and an absorbent core disposed between the top-surface sheet and the back-surface sheet; and
   a tail hole formed in the body portion, wherein
   the tail hole comprises:
      a hole body through which a tail of the cat is inserted;
      a lateral notch that increases a lateral length of the hole body by communicating with the hole body; and
      a longitudinal notch that increases a longitudinal length of the hole body by communicating with the hole body,
   the hole body bulges toward a stomach side or a back side of the cat diaper,
   the hole body:
      includes an apex, and base end edges on both sides, and
      has an arc shape connecting the apex and the base end edges, wherein the arc shape has a radius of curvature in a certain range,
   the radius of curvature is within the certain range in the case that:
      the radius of curvature is uniform, or
      the certain range is a range between a maximum radius of curvature and a minimum radius of curvature, wherein the difference between the maximum radius and the minimum radius is not more than 5% of the lateral length of the hole body,
   an angle formed between a virtual line and a tangent line of a rising portion is 80° or less, wherein the virtual line connects the base end edges and the rising portion rises from each of the base end edges toward the apex, and a lateral length of the tail hole including the hole body and the lateral notch is greater than a longitudinal length of the tail hole including the hole body and the longitudinal notch.

9. A cat diaper having a lateral direction along a waistline of a cat and a longitudinal direction orthogonal to the lateral direction, the cat diaper comprising:
   a body portion that has a top-surface sheet, a back-surface sheet, and an absorbent core disposed between the top-surface sheet and the back-surface sheet; and
   a tail hole formed in the body portion, wherein
   the tail hole comprises:
      a hole body through which a tail of the cat is inserted, and
      a lateral notch that is disposed in a lateral region that extends toward an outer side in the lateral direction from the hole body, and increases a dimension of the hole body by communicating with the hole body,
   the hole body includes:
      an apex; and
      base end edges on both sides, wherein
      the hole body has an arc shape connecting the apex and the base end edges,
   the dimension of the hole body is increased in the lateral direction by communicating with the lateral notch,
   the lateral notch is disposed on a lateral extension line that extends in the lateral direction from the base end edges, and
   the longitudinal length of the lateral notch is shorter than the longitudinal length of the hole body.

10. The cat diaper according to claim 9, wherein the lateral notch is disposed only in the lateral region.

11. The cat diaper according to claim 9, wherein the tail hole further comprises:
   a longitudinal notch disposed in a longitudinal region that extends in the longitudinal direction from the hole body.

12. The cat diaper according to claim 11, wherein a space between the longitudinal notch and the hole body is longer than a space between the lateral notch and the hole body.

13. The cat diaper according to claim 11, wherein a space between the longitudinal notch and each of the base end edges is longer than a space between the lateral notch and each of the base end edges.

14. The cat diaper according to claim 13, wherein the longitudinal notch is disposed at a position deviated from a longitudinal extension line that extends in the longitudinal direction from the base end edges.

15. The cat diaper according to claim 11, wherein a distance between the longitudinal notch and the hole body in the longitudinal direction is longer than a length of the longitudinal notch.

16. The cat diaper according to claim 9, wherein the tail hole is a portion where the top-surface sheet and the back-surface sheet are cut, and
a longitudinal tensile strength of at least one of the top-surface sheet and the back-surface sheet is higher than a lateral tensile strength of the one of the top-surface sheet and the back-surface sheet.

\* \* \* \* \*